Patented Feb. 16, 1926.

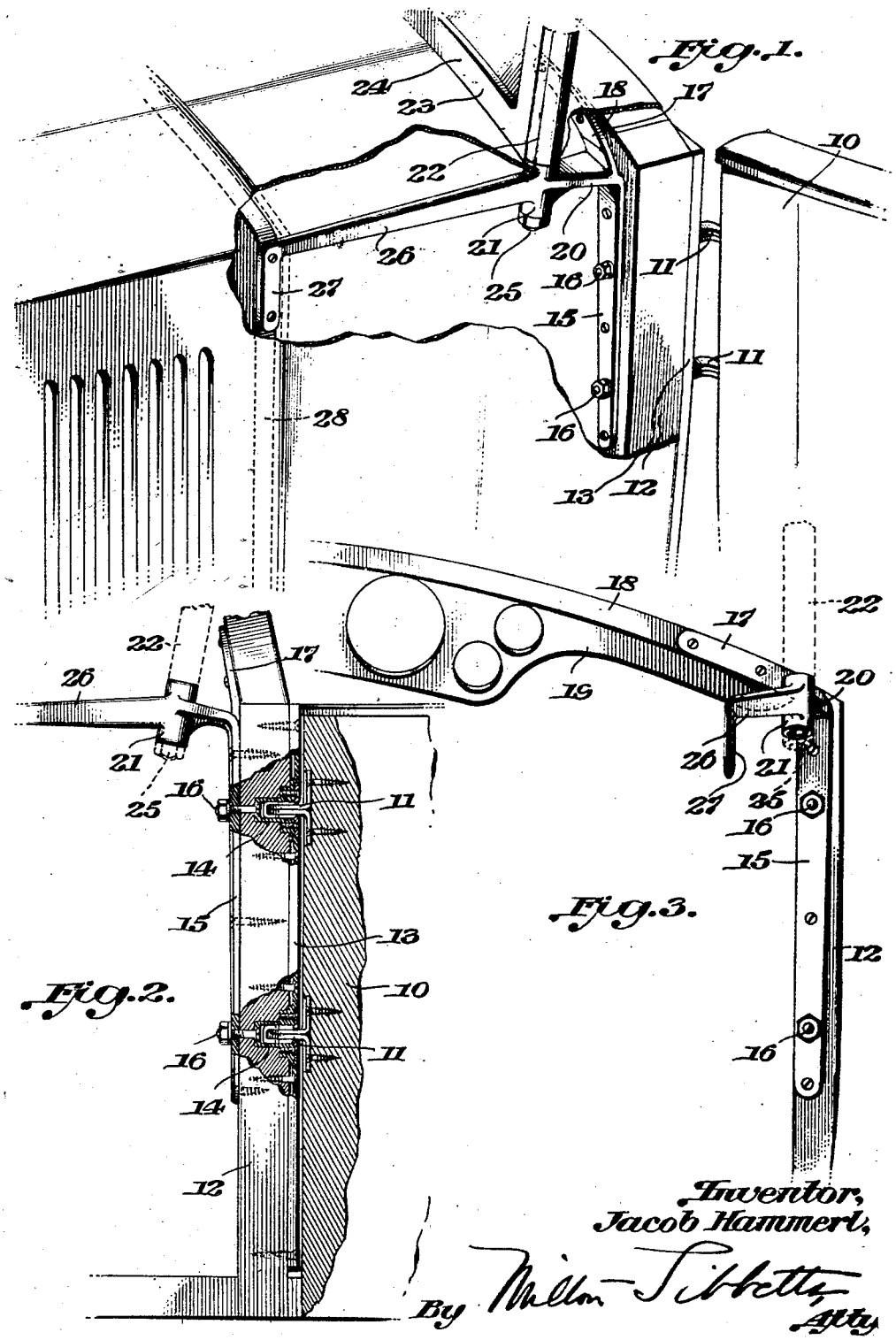

1,573,241

UNITED STATES PATENT OFFICE.

JACOB HAMMERL, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed February 24, 1919. Serial No. 278,777.

*To all whom it may concern:*

Be it known that I, JACOB HAMMERL, a citizen of the United States, and resident of Detroit, Wayne County, State of Michigan, have invented certain new and useful Improvements in Motor Vehicles, of which the following is a specification.

This invention relates to motor vehicles and more particularly to windshield supports therefor.

One object of the invention is to provide a support for a windshield which shall present only a pair of socket members beyond the exterior surface of the body for supporting the frame of the windshield.

Another object of the invention is to provide a member which shall not only serve to support the windshield but also shall serve to tie the pillar, cowl and dash firmly together.

With these objects and others in view, the invention is embodied in preferable form in the construction hereinafter described and illustrated in the accompanying drawings, in which Fig. 1 is a perspective view of part of a motor car showing the invention applied thereto;

Fig. 2 is a side view in elevation, partly broken away; and

Fig. 3 is a front view in elevation.

Referring to the drawings, 10 indicates a front door of a motor car adapted to swing on suitable hinges 11 which are in turn hung on a front corner pillar 12 and which pillar is preferably, as is usual, made of wood and forms part of the main body structure of a motor car. The hinge members are preferably mounted in a metallic rabbeting plate 13 having rabbeting sockets 14 seated in the pillar.

The windshield support constituting the main feature of the invention, consists of a metallic bracket having a depending brace arm 15 bearing against the wooden pillar 12 and secured thereto by means of bolts 16 which pass through the arm and through the inner end of the socket members 14, thus tying the metallic brace member 13, the pillar 12 and the metallic vertical brace arm 15 together, thereby not only strengthening the pillar structure but affording a rigid support for the parts the weight of which is carried by said pillar, such as the windshield and the swinging door.

The upper end of the arm 15 has a curved arm 17 conforming to the curved cowl reinforcement 18 at the upper edge of the instrument board 19. This plate 17 bears flat against the cowl reinforcement and is secured to the latter by suitable screws. Extending forwardly from the bracket 15 at the junction thereof with the plate 17 is a substantially horizontal arm 20 carrying at its outer end a tubular socket member 21 which is adapted to receive an upright stanchion 22 forming part of a frame 23 of a windshield of which 24 indicates the sash. The lower end of the stanchion projects through the socket and is held therein by means of a nut 25 engaging the end of the stanchion. Extending forwardly from the socket 21 of the support is an arm 26 which is bent slightly inward from the vertical longitudinal plane of the pillar so that the support will conform to the lines of the car and meet the outer edge of the dash. The front end of this arm is provided with a depending plate or arm 27 which is secured by screws or otherwise, to the vertical side edge of the dash 28. It will be seen that by means of the extended arm 26 which is rigidly secured to the dash, the latter element and the pillar and cowl are not only firmly tied together, but a firm support for each end of the socket carrying member is obtained and no additional means such as a plate which is now commonly employed for connecting the socket with the cowl is required.

Having thus described my invention, what I claim and desire to secure by Letters Patent is:

1. In a motor vehicle, the combination with the pillar, the cowl reinforcement supported thereby and the dash, of a bracket having an arm secured to said pillar, a second arm secured to said cowl reinforcement and a third arm extending forwardly under the cowl and terminating in a downward extension secured to the dash, said third arm having a socket receiving the wind shield support.

2. A bracket for motor vehicles having a substantially vertical arm adapted to be secured to a pillar, an integral arm at an angle to the first mentioned arm and adapted to be secured to the cowl frame, a forwardly extending arm substantially at right angles to the plane of a first mentioned arm and adapted to be secured to the dash and a socket member secured to the forwardly extending arm and adapted to extend through the cowl to receive a windshield support.

3. In combination with a motor vehicle having a pillar, a cowl structure and a dash, a bracket having three integrally connected arms, one of said arms being secured to said pillar, the second being secured to said cowl structure and the third being secured to said dash.

4. In combination with a motor vehicle having a pillar, a cowl structure, a dash and a windshield support, a bracket having three integrally connected arms, one of said arms being secured to said pillar, another secured to said cowl structure, and another secured to said dash, said last named arm having a socket adapted to receive said windshield support.

In testimony whereof I affix my signature.

JACOB HAMMERL.